US012685326B2

(12) United States Patent
    Kessler

(10) Patent No.:    US 12,685,326 B2
(45) Date of Patent:        Jul. 21, 2026

(54) SHAPED, READY-TO-COOK OR READY-TO-EAT EGG PRODUCT HAVING LOW AMOUNTS OF BINDER ADDITIVE

(71) Applicant: Cargill, Incorporated, Wayzata, MN (US)

(72) Inventor: Samuel Edward Kessler, Hopkins, MN (US)

(73) Assignee: Cargill, Incorporation, Wayzata, MN (US)

( * ) Notice: Subject to any disclaimer, the term of this patent is extended or adjusted under 35 U.S.C. 154(b) by 162 days.

(21) Appl. No.: 17/430,233

(22) PCT Filed: Feb. 12, 2020

(86) PCT No.: PCT/US2020/017836
    § 371 (c)(1),
    (2) Date: Aug. 11, 2021

(87) PCT Pub. No.: WO2020/167888
    PCT Pub. Date: Aug. 20, 2020

(65) Prior Publication Data
    US 2022/0248729 A1      Aug. 11, 2022

Related U.S. Application Data

(60) Provisional application No. 62/804,490, filed on Feb. 12, 2019.

(51) Int. Cl.
    *A23L 15/00*        (2026.01)
    *A23L 29/212*       (2016.01)
    (Continued)

(52) U.S. Cl.
    CPC ............... *A23L 15/20* (2016.08); *A23L 15/30* (2016.08); *A23L 29/212* (2016.08); *A23L 29/256* (2016.08); *A23B 5/04* (2013.01)

(58) Field of Classification Search
    CPC ........ A23L 15/20; A23L 15/30; A23L 29/212; A23L 29/256; A23B 5/04
    See application file for complete search history.

(56) References Cited

U.S. PATENT DOCUMENTS 3,073,704 A      1/1963  Rivoche
7,833,562 B2    11/2010  Ball
                (Continued)

FOREIGN PATENT DOCUMENTS

CA          1335163 A      4/1995
CA          2154224 A1     1/1997
                (Continued)

*Primary Examiner* — Katherine D Leblanc

(57)            ABSTRACT

Formed, ready-to-cook or ready-to-eat egg products are prepared by mixing a liquid egg composition comprising liquid egg in an amount sufficient so that the liquid egg composition is flowable at 35° F. with solid food inclusions, wherein at least 50% of the solid food inclusions have a longest dimension size of from 0.6 to 12 cm. From 5 to 45% of the solid food inclusions are at a temperature of less than 34° F. at the time of mixing. The resulting extrudable egg-based matrix comprises from 50 wt % to 90 wt % of the solid food inclusions, and is formed into a predetermined shape to provide a shaped, ready-to-cook or ready-to-eat egg product. The matrix additionally comprises a binder additive in an amount effective so that the shaped, ready-to-cook or ready-to-eat egg product is self-supporting for at least two minutes at an ambient temperature of 40° F.

19 Claims, 1 Drawing Sheet

(51) Int. Cl.
    *A23L 29/256*     (2016.01)
    *A23B 5/04*     (2006.01)

(56)           References Cited

U.S. PATENT DOCUMENTS

| | | | |
|---|---|---|---|
| 2005/0202150 A1* | 9/2005 | Tillis | A23L 15/30 |
| | | | 426/614 |
| 2005/0202151 A1 | 9/2005 | Tillis | |
| 2007/0237880 A1 | 10/2007 | Coleman | |
| 2007/0275127 A1 | 11/2007 | Ball | |
| 2008/0063777 A1 | 3/2008 | Roberts | |
| 2009/0246334 A1 | 10/2009 | Efstathiou | |
| 2011/0250323 A1* | 10/2011 | Martin | A23B 5/0055 |
| | | | 426/107 |
| 2018/0086535 A1 | 3/2018 | Schoenfellinger | |
| 2018/0132512 A1 | 5/2018 | Tolnick | |
| 2020/0205450 A1 | 7/2020 | Esquivel | |

FOREIGN PATENT DOCUMENTS

| | | | |
|---|---|---|---|
| EP | 0149517 B1 | 9/1989 | |
| GB | 992759 A | 5/1965 | |
| WO | 2019040831 A1 | 2/2019 | |

* cited by examiner

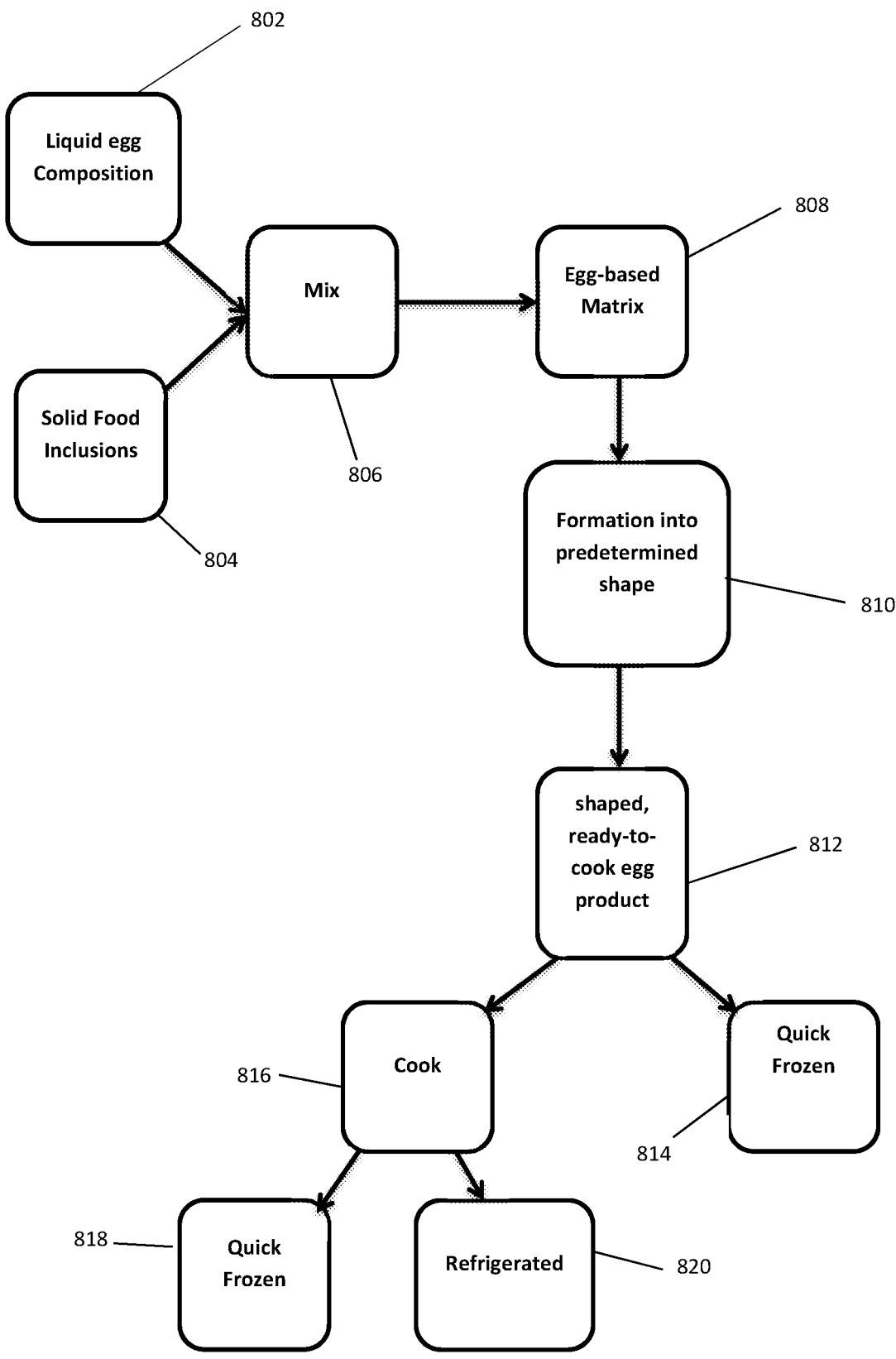

SHAPED, READY-TO-COOK OR READY-TO-EAT EGG PRODUCT HAVING LOW AMOUNTS OF BINDER ADDITIVE

CROSS REFERENCE TO RELATED APPLICATIONS

This application is a national phase application of PCT/US2020/017836, filed 12 Feb. 2020, entitled SHAPED, READY-TO-COOK OR READY-TO-EAT EGG PRODUCT HAVING LOW AMOUNTS OF BINDER ADDITIVE, which claims the benefit of U.S. Provisional Application No. 62/804,490, filed 12 Feb. 2019, entitled SHAPED, READY-TO-COOK OR READY-TO-EAT EGG PRODUCT HAVING LOW AMOUNTS OF BINDER ADDITIVE, each of which are hereby incorporated by reference in their entirety.

FIELD

The present invention relates to a method for manufacture of egg Products. More specifically, the present invention relates to methods of manufacture of formed egg products comprising inclusions and to methods of cooking such products.

BACKGROUND

Prior methods of preparing cooked egg products include providing a liquid egg blend, optionally comprising food inclusions, in the form of a flowable slurry that is poured into a retaining ring on a griddle or into a cooking pan. Other techniques include pouring the liquid blend into heavy metal pans that hold and support the flowable slurry in the desired shape while being cooked.

SUMMARY

In the present method, formed, ready-to-cook or ready-to-eat egg products are prepared by providing a liquid egg composition comprising from about 60 wt % to 100 wt % of liquid egg based on the total weight of the liquid egg composition, and optional viscosity increasing ingredients in an amount sufficient so that the liquid egg composition is flowable at 35° F.; and providing solid food inclusions, wherein at least 50% of the solid food inclusions have a longest dimension size of from 0.6 to 12 cm.

The liquid egg composition is mixed with the solid food inclusions to provide a extrudable egg-based matrix having an egg content of from about 15 wt % to 90 wt % based on the total extrudable egg-based matrix, and comprising from 50 wt % to 90 wt % of the solid food inclusions. From 5 to 45% of the solid food inclusions are at a temperature of less than 34° F. at the time of mixing.

The extrudable egg-based matrix is formed into a predetermined shape to provide a shaped, ready-to-cook egg product that is self-supporting for at least two minutes at an ambient temperature of 40° F., wherein the matrix additionally comprises a binder additive in an amount effective so that the shaped, ready-to-cook or ready-to-eat egg product is self-supporting for at least two minutes at an ambient temperature of 40° F.

It has been found that when a small portion of the solid food inclusions are provided at a low temperature and the matrix additionally comprises a relatively low amount of a binder additive, the resulting extrudable egg-based matrix exhibits excellent texture properties that make it possible to form the extrudable egg-based matrix into a shaped, ready-to-cook egg product where the resulting self-supporting shapes are stable for a time sufficient to allow the shaped, ready-to-cook egg product to be cooked without the need to support the composition in a cooking pan or other types of molds. This arrangement not only provides a unique and more appealing product, but it facilitates a fast and more nimble production setup. As mentioned above, prior production techniques require a flowable liquid egg composition to be poured into heavy metal pans, and the pans to be placed in an oven for curing. In order to automate that process, the heavy pans are conveyed on a conveyor belt from the filling station to the oven. After cooking, the pans would be turned upside down as the belt travels around a sprocket to return to the filling station, causing the final product to drop to a separate processing station. This process requires that the pans are fixed to the conveyor belt in an array, both for stability and to enable return of the pans to the filling station in an upside-down orientation on the belt. The prior art configuration requires significant initial investment in a conveyor system having an array of pans fixed to a belt. If changes are needed or desired in the size or shape of the product, all of the pans must be removed and replaced with new pans, requiring significant investment in time and money. In contrast, the present method may use a forming mold that does not travel through the oven, and therefore may sequentially produce number of products ready for conveying to the oven. This provides a savings in capital equipment cost, and facilitates far easier and less expensive product size and shape changes. In an aspect, the present method permits preparation of formed, ready-to-cook egg products in automated processing equipment at production rates exceeding 10 product units per minute from a single forming mold. In an aspect, a forming station for forming the ready-to-cook product comprises a plurality of forming molds, producing a plurality of ready-to-cook formed product units in parallel.

In an aspect, the final product is less uniform in appearance, which is more visually appealing, as compared to products cooked in a pan. Because the product is not constrained by a pan during the cooking process, multiple inclusions at various ratios and of different shapes and sizes can readily be added to the composition. The result is a unique innovative product that looks "less processed."

Because the present forming process does not use a pan to support the product during the cooking step, modifications in the forming step, either by process parameters or by change of the forming mold, permits quick conversion to prepare final cooked, shaped egg products of different shapes on the same line, and to make final cooked, shaped egg products having unique shapes that are difficult to prepare using conventional egg product pans.

Additionally, the present method and resulting product advantageously uses liquid egg as the majority component of the continuous phase of the ready-to-cook or ready-to-eat egg products, thereby providing nutritional benefit by affording high protein content and organoleptic benefit in affording unique flavor and texture profiles in the final product.

BRIEF DESCRIPTION OF THE DRAWINGS

The accompanying drawings, which are incorporated in and constitute a part of this application, illustrate several aspects of the invention and together with a description of the aspects serve to explain the principles of the invention. A brief description of the drawings is as follows:

FIG. 1 is a flow chart of an aspect of the present method.

DETAILED DESCRIPTION

The aspects of the present invention described below are not intended to be exhaustive or to limit the invention to the precise forms disclosed in the following detailed description. Rather, a purpose of the aspects chosen and described is by way of illustration or example, so that the appreciation and understanding by others skilled in the art of the general principles and practices of the present invention can be facilitated.

For purposes of the present invention, a ready-to-cook egg product is a food product wherein all the ingredients have been prepared and mixed or assembled, so that the consumer need only heat for consumption. The ready-to-cook egg product contains raw ingredients that must be heated to a temperature sufficient to kill any pathogenic microorganisms so that the product is safe to consume.

For purposes of the present invention, a ready-to-eat egg product is a food product wherein all the ingredients have been prepared and mixed or assembled, and the product has heated to a temperature sufficient to kill any pathogenic microorganisms so that the product is safe to consume. The ready-to-eat egg product may be eaten without further cooking or heating, or the consumer may optionally heat the product for consumption.

The method as described herein is discussed by reference to FIG. 1, which is a process diagram of an aspect of the present method.

As shown in FIG. 1, a liquid egg composition is provided at block 802, which comprises liquid egg and optional viscosity increasing ingredients in an amount sufficient so that the liquid egg composition is flowable at 35° F.

For purposes of the present invention, a liquid egg composition is flowable when the composition will flow out of a tipped container by gravity as a stream. In an aspect, the liquid egg composition has a dynamic viscosity of from about 1 to 2000 cP at 25° C. In an aspect, the liquid egg composition has a dynamic viscosity of from about 5 to 200 cP at 25° C. In an aspect, the liquid egg composition has a dynamic viscosity of from about 10 to 50 cP at 25° C. In an aspect, the liquid egg composition has a dynamic viscosity of from about 10 to 20 cP at 25° C.

In an aspect, the liquid egg composition used in the present process comprises from about 60 wt % to 100 wt % of liquid egg based on the total weight of the liquid egg composition. In an aspect, the liquid egg composition used in the present process comprises from about 75 wt % to 100 wt % of liquid egg based on the total weight of the liquid egg composition. In an aspect, the liquid egg composition used in the present process comprises from about 85 wt % to 100 wt % of liquid egg based on the total weight of the liquid egg composition. In an aspect, the liquid egg composition used in the present process comprises from about 90 wt % to 100 wt % of liquid egg based on the total weight of the liquid egg composition.

In an aspect, the liquid egg composition used in the present process additionally comprises an edible, food grade non-egg liquid such as water, milk, and mixtures thereof in an amount up to about 40% of the total liquid egg composition. The liquid egg composition is thickened as necessary with a suitable food grade texturizing ingredients (including thickeners), such as starch, citric acid, soy oil, carrageenan, guar, liquid egg, cooked egg portions or other solid food particles, so that the liquid egg composition is flowable at 35° F.

As used herein, the term "liquid egg" means liquid whole egg, liquid egg white, liquid egg yolk, liquid egg substitute, reconstituted egg powder, or any combination of the above. In an aspect, the liquid egg is selected from egg white, egg yolk, or a mixture of egg white and egg yolk. In an aspect, the liquid egg is whole egg.

In an aspect, the liquid egg composition further comprises solid food particles (such as cooked egg portions or other food components), so long as the liquid egg composition is flowable at 35° F. It has been found that such solid food particles can have a thickening effect and may aid in processing. In an aspect, at least 50% of the solid food particles have a longest dimension size of from 0.6 to 3 cm. It has been found that in particular addition of solid food particles that are cooked egg portions provides organoleptic benefits in texture and product appearance.

In an aspect, food ingredients other than egg that may be included in the liquid egg composition as solid food particles include particles from food sources such as cooked meats (such as ham, pork, beef steak portions, ground beef, chicken portions, ground chicken, fish, sausage, and the like, and mixtures thereof), vegetable pieces (such as asparagus, broccoli, beans, peppers, onions, potatoes and the like, and mixtures thereof), grains and legumes (such as quinoa, beans, chick peas, lentils, pulses, and the like, and mixtures thereof) or cheese (such as blue, cheddar, colby, gouda, monterey jack, swiss, and the like, and mixtures thereof), fruit (such as blueberries, raspberries, cranberries, apple, pear, and the like, and mixtures thereof), or bread (such as biscuits, french toast, and the like, and mixtures thereof).

As shown in FIG. 1, solid food inclusions are provided at block 804. At least about 50% of the solid food inclusions are provided at a temperature of less than 34° F. at the time of mixing with the liquid egg composition. The solid food inclusions may be selected from any edible substance having a longest dimension size of from 0.6 to 12 cm. In an aspect, at least 50% of the solid food inclusions may have a longest dimension size of from 0.6 to 10 cm, or from 0.6 to 8 cm, or from 0.6 to 6 cm, or from 0.6 to 4 cm, or from 1 to 4 cm, or from 1 to 3 cm. In an aspect, at least 60 wt % of the solid food inclusions have a longest dimension size of from 1 to 3 cm. In an aspect, at least 80 wt % of the solid food inclusions have a longest dimension size of from 1 to 3 cm. In an aspect, from 60 wt % to 90 wt % of the solid food inclusions have a longest dimension size of from 1 to 3 cm.

Examples of solid food inclusions include non-egg-based solid food inclusions, such as cooked or uncooked meats (such as ham, pork, beef steak portions, ground beef, chicken portions, ground chicken, fish, sausage, and the like, and mixtures thereof), vegetable pieces (such as asparagus, broccoli, beans, peppers, onions, potatoes and the like, and mixtures thereof), grains and legumes (such as quinoa, beans, chick peas, lentils, pulses, and the like, and mixtures thereof) or cheese (such as blue, cheddar, colby, gouda, monterey jack, swiss, and the like, and mixtures thereof), fruit (such as blueberries, raspberries, cranberries, apple, pear, and the like, and mixtures thereof), or bread (such as biscuits, french toast, and the like, and mixtures thereof). Mixtures of different types of non-egg-based solid food inclusions are particularly contemplated.

In an aspect, the solid food inclusions comprise egg-based solid food inclusions. The egg-based solid food inclusions may be prepared from cooked whole egg, liquid egg white, liquid egg yolk, liquid egg substitute, reconstituted egg powder, or any combination of the above. In an aspect, the egg-based solid food inclusions are prepared from cooked egg white, egg yolk, or a mixture of egg white and egg yolk. In an aspect, the egg-based solid food inclusions are prepared from cooked whole egg. In an aspect, the egg-based solid food inclusions are prepared by cooking the whole egg, e.g. by hard boiling, frying, steaming, poaching, and the like, and cutting the cooked egg to the desired size during or after cooking. In an aspect, the egg-based solid food inclusions are prepared by scrambling the whole egg and then cooking, e.g. by hard boiling, frying, steaming, poaching, and the like, and cutting the cooked egg to the desired size during or after cooking.

In an aspect, the egg-based solid food inclusions have a longest dimension size of from 0.6 to 12 cm. In an aspect, at least 50% of the egg-based solid food inclusions may have a longest dimension size of from 0.6 to 10 cm, or from 0.6 to 8 cm, or from 0.6 to 6 cm, or from 0.6 to 4 cm, or from 1 to 4 cm, or from 1 to 3 cm. In an aspect, at least 60 wt % of the egg-based solid food inclusions have a longest dimension size of from 1 to 3 cm. In an aspect, at least 80 wt % of the egg-based solid food inclusions have a longest dimension size of from 1 to 3 cm. In an aspect, from 60 wt % to 90 wt % of the egg-based solid food inclusions have a longest dimension size of from 1 to 3 cm.

Mixing of the liquid egg composition and the solid food inclusions is shown in FIG. 1 at block 806 to form an extrudable egg-based matrix, shown in FIG. 1 at block 808. Mixing can be carried out using any suitable mixing device, such as a mixer fitted with a paddle mixer or a ribbon mixer.

In an aspect, the extrudable egg-based matrix of the present process comprises from 15 wt % to 60 wt % of non-egg-based solid food inclusions. In an aspect, the extrudable egg-based matrix of the present process comprises from 20 wt % to 50 wt % of non-egg-based solid food inclusions. In an aspect, the extrudable egg-based matrix of the present process comprises from 25 wt % to 40 wt % of non-egg-based solid food inclusions In an aspect, the extrudable egg-based matrix of the present process comprises from about 15 wt % to 90 wt % based on the total extrudable egg-based matrix. In an aspect, the extrudable egg-based matrix of the present process comprises from about 35 wt % to 90 wt % of egg based on the total extrudable egg-based matrix, which egg may be provided to the matrix by the liquid egg composition or the liquid egg composition and the solid food inclusions. In an aspect, the extrudable egg-based matrix of the present process comprises from about 40 wt % to 60 wt % of egg. In an aspect, the extrudable egg-based matrix of the present process comprises from about 50 wt % to 70 wt % of egg. In an aspect, the extrudable egg-based matrix of the present process comprises from about 55 wt % to 65 wt % of egg.

In an aspect, from 5 to 45% of the solid food inclusions are at a temperature of less than 32° F. at the time of mixing with the liquid egg composition to provide a extrudable egg-based matrix, or are at a temperature of less than 25° F., or are at a temperature of less than 15° F., or are provided at a temperature of less than 5° F., or are at a temperature of less than 0° F., or are at a temperature of less than −5° F., or are at a temperature of less than −15° F., or are at a temperature of less than −25° F., or are at a temperature of less than −30° F. In an aspect, from 5 to 45% of the of the solid food inclusions are at a temperature from about −50 to 32° F. at the time of mixing with the liquid egg composition to provide a extrudable egg-based matrix; or are at a temperature from about −40 to 20° F.; or are at a temperature of from about −40 to 0° F.; or are at a temperature from about −30 to −10° F.

In an aspect, from 10 wt % to 35 wt % of the solid food inclusions are at a temperature of less than 32° F. at the time of mixing with the liquid egg composition to provide a extrudable egg-based matrix, or are at a temperature of less than 25° F., or are at a temperature of less than 15° F., or are provided at a temperature of less than 5° F., or are at a temperature of less than 0° F., or are at a temperature of less than −5° F., or are at a temperature of less than −15° F., or are at a temperature of less than −25° F., or are at a temperature of less than −30° F. In an aspect, from 10 wt % to 35 wt % of the of the solid food inclusions are at a temperature from about −50 to 32° F. at the time of mixing with the liquid egg composition to provide a extrudable egg-based matrix; or are at a temperature from about −40 to 20° F.; or are at a temperature of from about −40 to 0° F.; or are at a temperature from about −30 to −10° F.

In an aspect, from 15 wt % to 30 wt % of the solid food inclusions are at a temperature of less than 32° F. at the time of mixing with the liquid egg composition to provide a extrudable egg-based matrix, or are at a temperature of less than 25° F., or are at a temperature of less than 15° F., or are provided at a temperature of less than 5° F., or are at a temperature of less than 0° F., or are at a temperature of less than −5° F., or are at a temperature of less than −15° F., or are at a temperature of less than −25° F., or are at a temperature of less than −30° F. In an aspect, from 15 wt % to 30 wt % of the of the solid food inclusions are at a temperature from about −50 to 32° F. at the time of mixing with the liquid egg composition to provide a extrudable egg-based matrix; or are at a temperature from about −40 to 20° F.; or are at a temperature of from about −40 to 0° F.; or are at a temperature from about −30 to −10° F.

For purposes of the present invention, an extrudable egg-based matrix is extrudable if the matrix can be formed into a predetermined shape without voids having a size of greater than about 10% of the shape volume. In an aspect, the extrudable egg-based matrix can be formed into a predetermined shape without voids having a size of greater than about 5% of the shape volume.

It has been found that mixing of the liquid egg composition with the solid food inclusions when solid food inclusions are provided at a temperature of less than 34° F. provides unique viscosity and texture properties of the resulting extrudable egg-based matrix. While not being bound by theory, it is believed that the temperature differential of these two components provides a temporary binding effect of the liquid egg composition (of which a substantial portion is liquid) with the solid food inclusions, providing a extrudable egg-based matrix that is formable to a predetermined shape to provide a shaped, ready-to-cook egg product that is self-supporting for at least two minutes at an ambient temperature of 40° F. This matrix consistency property can be achieved without incorporating undue amounts of binder additives that could impart an undesired texture or flavor to the final product and/or could make the liquid egg composition difficult to prepare or handle, and/or could unduly increase cost of the product, and/or could necessitate incorporation of a relatively large amount of a food additive that is considered undesirable from a consumer perspective in view of consumer preferences to simplify the number and type of ingredients to be included in food products.

In an aspect, the liquid egg composition is mixed with the solid food inclusions to provide an extrudable egg-based matrix comprising from 60 wt % to 85 wt % of the solid food inclusions based on total extrudable egg-based matrix. In an aspect, the extrudable egg-based matrix comprises from 65 wt % to 80 wt % of the solid food inclusions based on total extrudable egg-based matrix.

The extrudable egg-based matrix additionally comprises a binder additive. In general, a binder additive is any ingredient that can help the extrudable egg-based matrix hold its shape, remain bound together, thicken, or improve texture or the shelf life characteristics of the final product, particularly where the final product is frozen after cooking.

The extrudable egg-based matrix comprises a binder additive in an amount effective so that the shaped, ready-to-cook or ready-to-eat egg product is self-supporting for at least two minutes at an ambient temperature of 40° F. In an aspect, the binder additive is present in the matrix as not more than 10 wt % of the shaped, ready-to-cook or ready-to-eat egg product. In an aspect, the binder additive is present in the matrix as from 2 wt % to 9 wt % of the shaped, ready-to-cook or ready-to-eat egg product. In an aspect, the binder additive is present in the matrix as from 3 wt % to 8 wt % of the shaped, ready-to-cook or ready-to-eat egg product.

In an aspect, the binder additive is selected from the group consisting of starches, proteins, fibers, fats, hydrocolloids, gums, soy bulking agents, gelling agents, and mixtures thereof. In an aspect, the binder additive comprises starch that is derived from a vegetable and/or a fruit. In an aspect, the binder comprises starch that is derived from a material from corn, potato, sweet potato, tapioca, cassava, rice, wheat, barley, millet, legumes, and mixtures thereof. In an aspect, the binder additive comprises a protein from dairy (such as whey, casein, and dried egg fractions (e.g., dried egg yolk, dried egg white, powdered milk)), gelatin, and soy. In an aspect, the binder additive comprises fibers, such as inulin, psyllium, beta-glucan, legumes, and cocoa powder. In an aspect, the binder additive comprises a gum selected from the group consisting of xanthan gum, gellen gum, guar gum, locust bean gum, cellulose gum, tara gum, and gum Arabic. In an aspect, the binder additive comprises a hydrocolloid selected from the group consisting of carrageenan, pectin, alginic acid, cellulose, modified cellulose, and tragacanth. In an aspect, the binder additive comprises a gelling agent, such as gelatin, alginate, carrageenan, gum, pectin, konjac, agar, food acid, rennet, starch, starch derivatives, and combinations thereof.

In an aspect, the binder additive is selected from an unmodified starch. In an aspect, the starch is a modified starch. In an aspect, the starch is a pregelatinized starch. In an aspect, the binder additive is selected from a starch that is modified by reacting with one or more agents such as alkaline, acid, bleach, oxidant, a phosphate, an esterification agent, propylene oxide.

The extrudable egg-based matrix may optionally comprise additional ingredients, which may be initially provided in the liquid egg composition, or with the solid food inclusions, or both. In an aspect, the extrudable egg-based matrix comprises ingredients such as water, flavorants (e.g., pepper flavor, butter flavor, egg flavor, potato flavor, meat flavor), spices, salts (e.g., sodium chloride, potassium chloride), organic acids (e.g., citric acid), preservative, and/or coloring agents (e.g., annatto).

In an aspect, the extrudable egg-based matrix comprises materials mixed at respective temperatures such that the extrudable egg-based matrix has a consistency when measured three minutes after mixing that is in the same range as the consistency ranges recommended for ground beef to be formed into patties using patty formation equipment.

In an aspect, the liquid egg composition and the solid food inclusions are cooled during the mixing step to form the extrudable egg-based matrix. This cooling has been found to facilitate providing a shaped, ready-to-cook or ready-to-eat egg product that is self-supporting for the desired time duration at an ambient temperature of 40° F. In an aspect, the vessel used to mix the liquid egg composition and the solid food inclusions is cooled during the mixing step, for example, by jacketing the vessel for temperature control. In an aspect, the liquid egg composition and the solid food inclusions are cooled during the mixing step by incorporation of an inert material that is a gas at Standard Temperature and Pressure, but applied in the form of a liquid or solid. In an aspect, the liquid egg composition and the solid food inclusions are cooled during the mixing step by incorporation of liquid nitrogen, carbon dioxide or other appropriate food-grade freezing spray. In an aspect, the liquid egg composition and the solid food inclusions are cooled during the mixing step by incorporation of dry ice (i.e. carbon dioxide in solid form), in an aspect either in granular or powder form.

The step of forming the extrudable egg-based matrix into a predetermined shape is shown in FIG. 1 at block 810, which provides a shaped, ready-to-cook egg product, as shown in FIG. 1 at block 812.

In an aspect, the extrudable egg-based matrix is formed into a predetermined shape to provide a shaped, ready-to-cook egg product that is self-supporting for at least two minutes at an ambient temperature of 40° F. In an aspect, the extrudable egg-based matrix is formed into a predetermined shape to provide a shaped, ready-to-cook or ready-to-eat egg product that is self-supporting for at least three minutes at an ambient temperature of 40° F. In an aspect, the extrudable egg-based matrix is formed into a predetermined shape to provide a shaped, ready-to-cook or ready-to-eat egg product that is self-supporting for at least 5 minutes at an ambient temperature of 40° F. In an aspect, the extrudable egg-based matrix is formed into a predetermined shape to provide a shaped, ready-to-cook or ready-to-eat egg product that is self-supporting for at least 20 minutes at an ambient temperature of 40° F.

For purposes of the present invention, a shaped, ready-to-cook or ready-to-eat egg product is evaluated for determining whether it is self-supporting for the indicated duration by placing the prepared product on a stable surface at an ambient temperature of 40° F., taking photographs of the product in full field of the photo image at the beginning and end of the time frame. The photographs are compared to determine whether any slumping or other product shape change occurs during the indicated term, for example in the width of the product as measured at the bottom of the product, or in the height of the product. If no dimension of the product has changed more than 5% over the indicated time, the product is considered to be self-supporting. This is in contrast with conventional compositions that flow in ambient temperature conditions and which must be supported by walls of a pan during the cooking process. In an aspect, the product is formulated and prepared so that no dimension of the product has changed more than 3% over the indicated time at an ambient temperature of 40° F. In an aspect, the product is formulated and prepared so that no dimension of the product has changed more than 1% over the indicated time at an ambient temperature of 40° F. In each of the above indicated evaluations of dimension, the indicated time if evaluation may be selected from 2 minutes, 5 minutes, 15 minutes or 20 minutes; wherein the longer time duration represents a more challenging test. Generally, a product exhibiting dimensional stability for time periods of 2 minutes or 5 minutes is sufficient for purposes of production under most conditions. However, in an aspect of the invention a product exhibiting dimensional stability for time periods of 15 minutes or 20 minutes is desired in order to provide an intermediate product exhibiting a greater resiliency in the event that more time is needed between shape formation and further processing.

In an aspect, the shaped, ready-to-cook or ready-to-eat egg product is formed in the shape of a patty. The perimeter of the patty may have any desired geometrical shape, such as circular, oval, square, rectangular, star, or irregular shape.

In an aspect, the shaped, ready-to-cook or ready-to-eat egg product is formed in a three dimensional shape selected from a) generally of a rectangular prism, b) generally of a cylinder, and c) a generally spherical shape.

In an aspect, the extrudable egg-based matrix is pumped into a forming plate to define the predetermined shape of the shaped, ready-to-cook or ready-to-eat egg product and removed from the forming plate to provide the self-supporting, shaped, ready-to-cook or ready-to-eat egg product.

In an aspect, the extrudable egg-based matrix is cooled during the forming step. In an aspect, the extrudable egg-based matrix is cooled by incorporation of an inert material that is a gas at Standard Temperature and Pressure, but applied in the form of a liquid or solid to the extrudable egg-based matrix during the forming process. In an aspect, the inert material is liquid nitrogen or dry ice as described above.

In an aspect, the extrudable egg-based matrix is at a temperature of from 16-34° F. during the forming step. In an aspect, the extrudable egg-based matrix is at a temperature of from 28-34° F. during the forming step. The temperature of the extrudable egg-based matrix is evaluated by inserting a temperature probe into the matrix without piercing the any frozen solid food inclusions present in the matrix. It is understood that this measurement is thus a measurement of the non-frozen regions of the matrix that in part may be chilled by proximity to frozen portions in the matrix.

The formation step can be carried out using any suitable forming device, such as a piston formation device (for example, commercially available from Formax), a twin screw extruder (for example, commercially available from Reiser), and a Vein Extruder (for example, commercially available from Handtmann). In an aspect, the extrudable egg-based matrix is formed into a predetermined shape to provide formed, ready-to-cook or ready-to-eat egg products using automated product forming equipment, such as those made to form hamburger patties and the like. These machines operate by feeding the food product to be formed (conventionally, a ground meat mixture, but in the present case, the extrudable egg-based matrix) from a hopper in discrete portion amounts to a mold plate assembly. The food product to be formed is compressed with pressure in the mold plate assembly to the desired predetermined shape. The shape can be easily adjusted by changing the size and configuration of the mold plate assembly, mold die shape, the die depth (to change final product thickness), and the quantity of portion dispensed into the mold plate assembly.

Examples of suitable automated product forming equipment are commercially available from a number of sources, such as the Formax® forming system, Hollymatic™ Patty Machines, Vemag™ patty formers, Biro™ patty formers (for example, the Vemag™ FM250 patty forming system), and the like.

In an aspect, the extrudable egg-based matrix is formed into a predetermined shape to provide formed, ready-to-cook or ready-to-eat egg products using automated product forming equipment at a single production line production rate of at least 10 product units per minute, or at a production rate of at least 20 product units per minute, or at a production rate of at least 30 product units per minute, or at a production rate of at least 40 product units per minute, or at a production rate of at least 50 product units per minute, or at a production rate of at least 60 product units per minute. In an aspect, the extrudable egg-based matrix is formed into a predetermined shape to provide formed, ready-to-cook or ready-to-eat egg products using automated product forming equipment at a single production line production rate of from about 10 to about 200 product units per minute, or at a production rate of from about 20 to about 200 product units per minute, or at a production rate of from about 30 to about 200 product units per minute, or at a production rate of from about 40 to about 200 product units per minute, or at a production rate of from about 50 to about 200 product units per minute, or at a production rate of from about 60 to about 200 product units per minute, or at a production rate of from about 70 to about 200 product units per minute, or at a production rate of from about 80 to about 200 product units per minute. In an aspect, the automated product forming equipment is configured to comprise a plurality of production lines within the equipment, so that on each "stroke" of the forming equipment a plurality of forming molds are engaged to form shaped, ready-to-cook or ready-to-eat egg products in parallel. In an aspect, from 2 to 40 forming molds are engaged to form shaped, ready-to-cook or ready-to-eat egg products in parallel on each "stroke" of the forming equipment. In such an aspect, the above noted production rates are multiplied by the number of forming molds are engaged in each stroke to provide a total productivity rate.

In an aspect, the shaped egg product is quick frozen after shaping, as shown in FIG. 1 at block 814. In this aspect, the product may be delivered to the consumer as a ready-to-cook egg product. Quick freezing may be carried out by any suitable method, such as by using IQF technology such as by a production tunnel freezer, In an aspect, the shaped egg product is cooked to form a cooked, shaped egg product, as shown in FIG. 1 at block 816, and then either quick frozen as shown in block 818 or refrigerated, as shown in block 820. In an aspect, the shaped egg product is cooked in a continuous impingement oven. In an aspect, the shaped egg product is cooked in a fryer or in a heated belt oven. In an aspect, the shaped egg product is quickly cooked in a manner to preserve the shape as imparted by the forming process. In an aspect, the shaped egg product is deposited onto a continuous belt which conveys the shaped egg product through a continuous line oven to cook the shaped egg product.

In an aspect, the shaped, ready-to-cook egg product is baked at an oven temperature of from about 250° F. to about 450° F., or in an aspect from about 300° F. to about 350° F., for a time suitable to complete cooking of the shaped egg product. In an aspect, the shaped, egg product is cooked for a time of from about 5 to 40 minutes.

In an aspect, the shape of the cooked egg product is different from the shape of the shaped, egg product prior to cooking, because of flow of portions of the product during cooking. As an example, a shaped, egg product prior to cooking may have the general appearance of a cube, or a ball. In an aspect, the shaped egg product is formed in a ball using a ball control device, such as the Vemag™ Ball Control BC237 device.

EXAMPLES

Example 1

A liquid egg composition was prepared by providing a liquid egg and adding dry components as shown in Table 1:

TABLE 1

| Liquid Egg Mix | |
| --- | --- |
| Pasteurized Whole Egg | 93.140% |
| Citric Acid | 0.06% |
| Starch | 2.40% |
| Soy Oil | 4.00% |
| Carrageenan | 0.40% |
| | 100.00% |

The thus prepared liquid egg composition was mixed with solid food inclusions and additives in the amounts indicated in Table 2 to provide an extrudable egg-based matrix.

TABLE 2

| Sausage Egg & Cheese | |
| --- | --- |
| Liquid Egg Mix | 69.20% |
| Scrambled Egg | 10.00% |
| Pork Sausage | 8.00% |
| Cheddar Cheese | 7.00% |
| Seasoning | 0.50% |
| Salt | 0.30% |
| Diced Potato (3/8 Inch) | 5.00% |
| | 100.00% |

Example 2

A liquid egg composition was prepared by providing a liquid egg and adding dry components as shown in Table 3:

TABLE 3

| Liquid Egg Mix | |
| --- | --- |
| Pasteurized Whole Egg | 93.140% |
| Citric Acid | 0.06% |
| Starch | 2.40% |
| Soy Oil | 4.00% |
| Carrageenan | 0.40% |
| | 100.00% |

The thus prepared liquid egg composition was mixed with solid food inclusions and additives in the amounts indicated in Table 4 to provide an extrudable egg-based matrix.

TABLE 4

| Sausage Egg & Cheese | |
| --- | --- |
| Liquid Egg Mix | 32% |
| Scrambled Egg | 25.5% |
| Pork Sausage | 16% |
| Cheddar Cheese | 15% |
| Hash-brown potato flavor | 0.1% |
| Sausage flavor | 0.25% |

12

TABLE 4-continued

| Sausage Egg & Cheese | |
| --- | --- |
| Seasoning | 0.75% |
| Salt | 0.4% |
| Diced Potato (3/8 Inch) | 10% |

The compositions as describe above may be formed into patties, balls, or other shapes suitable for cooking. Because they are self-supporting for at least two minutes at an ambient temperature of 40° F., the formed matrix is readily processed in large scale production systems.

ADDITIONAL EXAMPLES

The following examples are provided, the numbering of which is not to be construed as designating levels of importance:

Example 1 provides a method of preparing formed, ready-to-cook or ready-to-eat egg products comprising, a) providing a liquid egg composition comprising from about 60 wt % to 100 wt % of liquid egg based on the total weight of the liquid egg composition, and optional viscosity increasing ingredients in an amount sufficient so that the liquid egg composition is flowable at 35° F.;

b) providing solid food inclusions, wherein at least 50% of the solid food inclusions have a longest dimension size of from 0.6 to 12 cm;

c) mixing the liquid egg composition with the solid food inclusions to provide an extrudable egg-based matrix having an egg content of from about 15 wt % to 90 wt % based on the total extrudable egg-based matrix, and comprising from 30 wt % to 90 wt % of the solid food inclusions, wherein from 5 to 45% of the solid food inclusions are at a temperature of less than 34° F. at the time of mixing; and d) forming the extrudable egg-based matrix into a predetermined shape to provide a shaped, ready-to-cook or ready-to-eat egg product;

wherein the matrix additionally comprises a binder additive in an amount effective so that the shaped, ready-to-cook or ready-to-eat egg product is self-supporting for at least two minutes at an ambient temperature of 40° F.

Example 2 provides the method of example 1, wherein from 10 wt % to 35 wt % of the solid food inclusions are at a temperature of less than 34° F. at the time of mixing.

Example 3 provides the method of example 1 or any other preceding example, wherein from 15 wt % to 30 wt % of the solid food inclusions are at a temperature of less than 34° F. at the time of mixing.

Example 4 provides the method of example 1 or any other preceding example, wherein the binder additive is present in the matrix as not more than 10 wt % of the shaped, ready-to-cook or ready-to-eat egg product.

Example 5 provides the method of example 1 or any other preceding example, wherein the binder additive is present in the matrix as from 2 wt % to 9 wt % of the shaped, ready-to-cook or ready-to-eat egg product.

Example 6 provides the method of example 1 or any other preceding example, wherein the binder additive is present in the matrix as from 3 wt % to 8 wt % of the shaped, ready-to-cook or ready-to-eat egg product.

Example 7 provides the method of example 1 or any other preceding example, wherein the binder additive is selected from the group consisting of starches, hydrocolloids, gums, soy bulking agents, and mixtures thereof.

Example 8 provides the method of example 1 or any other preceding example, wherein the binder additive comprises starch that is derived from a vegetable.

Example 9 provides the method of example 1 or any other preceding example, wherein the binder additive comprises starch that is derived from a material selected from corn, potato, sweet potato, cassava, rice, wheat, barley, millet, legumes, and mixtures thereof.

Example 10 provides the method of example 1 or any other preceding example, wherein the binder additive comprises a gum selected from the group consisting of xanthan gum, locust bean gum, and gum Arabic.

Example 11 provides the method of example 1 or any other preceding example, wherein the binder additive comprises a hydrocolloid selected from the group consisting of carrageenan and pectin.

Example 12 provides the method of example 1 or any other preceding example, wherein the extrudable egg-based matrix comprises from 50 wt % to 90 wt % of the solid food inclusions based on the total extrudable egg-based matrix.

Example 13 provides the method of example 1 or any other preceding example, wherein the liquid egg is selected from egg white and egg yolk or a mixture thereof.

Example 14 provides the method of example 1 or any other preceding example, wherein the liquid egg is whole egg.

Example 15 provides the method of example 1 or any other preceding example, wherein the liquid egg composition comprises 75 wt % to 100 wt % of liquid egg based on the total weight of the liquid egg composition.

Example 16 provides the method of example 1 or any other preceding example, wherein the liquid egg composition comprises cooked egg portions.

Example 17 provides the method of example 1 or any other preceding example, wherein the solid food inclusions comprise egg-based solid food inclusions.

Example 18 provides the method of example 1 or any other preceding example, wherein the extrudable egg-based matrix comprises from about 35 wt % to 90 wt % of egg based on the total extrudable egg-based matrix.

Example 19 provides the method of example 1 or any other preceding example, wherein the extrudable egg-based matrix comprises from about 40 wt % to 60 wt % of egg based on the total extrudable egg-based matrix.

Example 20 provides the method of example 1 or any other preceding example, wherein the shaped, ready-to-cook or ready-to-eat egg product has the shape of a patty.

Example 21 provides the method of example 1 or any other preceding example, further comprising the step of cooking the shaped egg product to form a cooked, shaped egg product.

Example 22 provides the method of example 18 or any other preceding example, wherein the shaped egg product is deposited onto a continuous belt which conveys the shaped egg product through a continuous line oven to cook the shaped egg product.

Example 23 provides the product made by the process of any one of examples 1-21.

As used herein, the terms "about" or "approximately" mean within an acceptable range for the particular parameter specified as determined by one of ordinary skill in the art, which will depend in part on how the value is measured or determined, e.g., the limitations of the sample preparation and measurement system. Examples of such limitations include preparing the sample in a wet versus a dry environment, different instruments, variations in sample height, and differing requirements in signal-to-noise ratios. For example, "about" can mean greater or lesser than the value or range of values stated by 1/10 of the stated values, but is not intended to limit any value or range of values to only this broader definition. For instance, a concentration value of about 30% means a concentration between 27% and 33%. Each value or range of values preceded by the term "about" is also intended to encompass the aspect of the stated absolute value or range of values. Alternatively, particularly with respect to biological systems or processes, the term can mean within an order of magnitude, preferably within 5-fold, and more preferably within 2-fold, of a value.

Throughout this specification and claims, unless the context requires otherwise, the word "comprise", and variations such as "comprises" and "comprising", will be understood to imply the inclusion of a stated integer or step or group of integers or steps but not the exclusion of any other integer or step or group of integer or step. When used herein "consisting of" excludes any element, step, or ingredient not specified in the claim element. When used herein, "consisting essentially of" does not exclude materials or steps that do not materially affect the basic and novel characteristics of the claim. In the present disclosure of various aspects, any of the terms "comprising", "consisting essentially of" and "consisting of" used in the description of an aspect may be replaced with either of the other two terms.

All patents, patent applications (including provisional applications), and publications cited herein are incorporated by reference as if individually incorporated for all purposes. Unless otherwise indicated, all parts and percentages are by weight and all molecular weights are weight average molecular weights. The foregoing detailed description has been given for clarity of understanding only. No unnecessary limitations are to be understood therefrom. The invention is not limited to the exact details shown and described, for variations obvious to one skilled in the art will be included within the invention defined by the claims.

What is claimed is:

1. A method of preparing raw shaped, ready-to-cook egg products comprising, a) providing a liquid egg composition comprising from about 60 wt % to 100 wt % of liquid egg based on the total weight of the liquid egg composition, wherein the liquid egg composition is flowable at 35° F.;

b) providing solid food inclusions, wherein at least 50% of the solid food inclusions have a longest dimension size of from 0.6 to 12 cm;

c) mixing the liquid egg composition with the solid food inclusions to provide an extrudable egg-based matrix having a total egg content of from about 15 wt % to 90 wt % based on the total extrudable egg-based matrix, and comprising from 30 wt % to 90 wt % of the solid food inclusions;

d) forming the extrudable egg-based matrix into a raw shaped, ready-to-cook egg product having a predetermined shape that is self-supporting; and e) cooling at least one of: (i) the liquid egg composition and the solid food inclusions during the mixing step of (c); and (ii) the extrudable egg-based matrix during the forming step of (d), wherein during the forming step (d) the extrudable egg-based matrix is at a temperature of from 16° F. to 34° F.;

wherein the extrudable egg-based matrix additionally comprises a binder additive selected from the group consisting of starches, hydrocolloids, gums, soy bulking agents, and mixtures thereof, wherein the binder additive is present in an amount effective so that the raw shaped, ready-to-cook egg product is self-support-ing for at least two minutes at an ambient temperature of 40° F.

2. The method of claim 1, wherein from 10 wt % to 35 wt % of the solid food inclusions are at a temperature of less than 34° F. at the time of mixing.

3. The method of claim 1, wherein the binder additive is present in the matrix as from 2 wt % to 9 wt % of the raw shaped, ready-to-cook egg product.

4. The method of claim 1, wherein the binder additive comprises starch that is derived from a material selected from corn, potato, sweet potato, cassava, rice, wheat, barley, millet, legumes, and mixtures thereof.

5. The method of claim 1, wherein the binder additive comprises a gum selected from the group consisting of xanthan gum, locust bean gum, and gum Arabic.

6. The method of claim 1, wherein the binder additive comprises a hydrocolloid selected from the group consisting of carrageenan and pectin.

7. The method of claim 1, wherein the extrudable egg-based matrix comprises from 50 wt % to 90 wt % of the solid food inclusions based on the total extrudable egg-based matrix.

8. The method of claim 1, wherein the liquid egg is selected from egg white and egg yolk or a mixture thereof.

9. The method of claim 1, wherein the liquid egg is whole egg.

10. The method of claim 1, wherein the liquid egg composition comprises cooked egg portions.

11. The method of claim 1, wherein the solid food inclusions comprise egg-based solid food inclusions.

12. The method of claim 1, wherein the extrudable egg-based matrix has a total egg content of from about 35 wt % to 90 wt % of egg based on the total extrudable egg-based matrix, which total egg content may be provided to the matrix by the liquid egg composition or the liquid egg composition and any egg-based solid food inclusions present in the total extrudable egg-based matrix.

13. The method of claim 1, wherein the raw shaped, ready-to-cook egg product is cooked on a cooking surface without an intermediate freezing step and without the use of a pan or mold that supports the shape of the egg product during the cooking step to form a cooked, shaped egg product.

14. A raw, shaped egg product made by the process of claim 1.

15. The method of claim 1, wherein the liquid egg composition comprises a viscosity increasing ingredient in an amount sufficient so that the liquid egg composition is flowable at 35° F.

16. The method of claim 1, wherein during the forming step (d) the extrudable egg-based matrix is at a temperature of from 28° F. to 34° F.

17. The method of claim 1, wherein the temperature of the extrudable egg-based matrix is measured by inserting a temperature probe into the matrix without piercing any frozen solid food inclusions present in the matrix.

18. The method of claim 1, wherein the liquid egg composition and the solid food inclusions are cooled during the mixing step of (c) using liquid nitrogen.

19. The method of claim 1, wherein the extrudable egg-based matrix is cooled during the forming step of (d) using liquid nitrogen.

\* \* \* \* \*